United States Patent [19]

Hattori et al.

[11] Patent Number: 5,043,895
[45] Date of Patent: Aug. 27, 1991

[54] METHOD OF CONTROLLING GEAR CHANGING OPERATION IN AUTOMATIC TRANSMISSION

[75] Inventors: Toshihiro Hattori, Ayase; Jyunzo Kuroyanagi, Kamakura; Yasuyoshi Asagi; Hitoshi Kasai, both of Kawasaki, all of Japan

[73] Assignees: Izuzu Motors Limited, Tokyo; Fujitsu Limited, Kawasaki, both of Japan

[21] Appl. No.: 374,551

[22] Filed: Jul. 5, 1989

Related U.S. Application Data

[63] Continuation of Ser. No. 24,913, Mar. 12, 1987, abandoned, which is a continuation of Ser. No. 625,698, Jun. 28, 1984, abandoned.

[30] Foreign Application Priority Data

Jun. 30, 1983 [JP] Japan ................................ 58-118451
Jun. 30, 1983 [JP] Japan ................................ 58-118452

[51] Int. Cl.⁵ ........................ B60K 41/18; G06F 15/20
[52] U.S. Cl. .................................... 364/424.1; 74/866
[58] Field of Search ................ 364/424.1; 74/866, 859

[56] References Cited

U.S. PATENT DOCUMENTS

| 4,361,060 | 11/1982 | Smyth | 74/866 |
| 4,367,528 | 1/1983 | Kawamoto et al. | 364/424.1 |
| 4,373,619 | 2/1983 | Schritt et al. | 192/3.28 |
| 4,412,290 | 10/1983 | Pannier | 364/424.1 |
| 4,486,838 | 12/1984 | Itoh et al. | 364/424.1 |
| 4,495,576 | 1/1985 | Ito | 74/866 |
| 4,497,222 | 2/1985 | Nagaoka et al. | 74/336 R |
| 4,509,124 | 4/1985 | Suzuki et al. | 74/866 |
| 4,519,484 | 5/1985 | Nagaoka et al. | 74/366 R |
| 4,622,637 | 11/1986 | Tomita et al. | 364/424.1 |

FOREIGN PATENT DOCUMENTS

| 0184751 | 11/1982 | Japan | 364/424.1 |
| 0030555 | 2/1983 | Japan | 364/424.1 |
| 1493191 | 11/1977 | United Kingdom | 364/424.1 |
| 2025546 | 1/1980 | United Kingdom | |

Primary Examiner—Parshotam S. Lall
Assistant Examiner—V. N. Trans
Attorney, Agent, or Firm—Staas & Halsey

[57] ABSTRACT

A method of controlling the gear changing operation in an automatic transmission having a gear transmission actuatable by a gear changing actuator assembly controlled by an electronic control system. When operating the gear changing actuator assembly for a gear changing operation, an interval of time, which elapses after the gear changing actuator assembly is operated, is measured with a timer. The measured interval of time is compared with a preset interval of time. When a lock is detected as being caused at the time the gear changing operation is not completed within the preset interval of time, the gear changing actuator assembly is operated to a gear position different from a gear position which the gear changing actuator assembly has originally been operated to select.

4 Claims, 4 Drawing Sheets

METHOD OF CONTROLLING GEAR CHANGING OPERATION IN AUTOMATIC TRANSMISSION

This is a continuation of copending application Ser. No. 07/024,913 filed on Mar. 12, 1987, now abandoned, which is a continuation of application Ser. No. 625,698 filed on June 28, 1984, now abandoned.

BACKGROUND OF THE INVENTION

The present invention relates to a method of controlling the gear changing operation in an electronically controlled automatic transmission to cope with a temporary lock during the gear changing operation.

There have been developed in recent years electronically controlled automatic transmissions controlled by electronic control devices. The electronically controlled automatic transmissions are controlled in their gear changing operation dependent on a car speed and the extent to which an accelerator pedal has been depressed. The electronic control device is composed of a microcomputer for detecting the car speed and the extent of depression of the accelerator pedal, searching a shift map, picking up a first gear changing condition to indicate an optimum gear position, and then starting a desired gear changing operation. A gear changing or transmission actuator assembly is actuated successively into a neutral position, a gear selecting position, and then a gear shifting position to shift the gears into the optimum gear position.

Operation of the gear changing actuator assembly sometimes suffers a temporary lock in mechanical, hydraulic, and electric systems. When such a lock is caused, no gear changing operation can be effected to allow the car to run idly. If attempts are made continuously to perform a gear changing operation, the gear changing actuator assembly and the gear transmission will be damaged or broken. The gear transmission and the gear changing actuator assembly will then have a reduced service life. During the temporary lock, the control process for the gear transmission does not proceed to a next step, thus allowing the car to run idly in an uncontrolled condition which is quite dangerous, and no smooth subsequent gear changing operation can be carried out.

SUMMARY OF THE INVENTION

It is an object of the present invention to provide a method of controlling the gear changing operation in an automatic transmission to prevent a gear changing actuator assembly from being damaged and permit a smooth gear changing operation again when a temporary lock is produced in a mechanical, hydraulic, or electric system while the gear changing actuator assembly is in operation.

To achieve the foregoing objects, according to the present invention, an interval of time which elapses after the gear changing actuator assembly is operated is measured with a timer, and the measured interval of time is compared with a preset interval of time. When a lock is detected as being caused at the time the gear changing operation is not completed within the preset interval of time, the following steps are taken:

(a) The gear changing actuator assembly is operated to select a gear position different from a gear position which the gear changing actuator assembly has originally been operated to select. By definition and as used hereinafter in the specification and claims, the term "gear position" includes a neutral gear position, as well as a first, second, third or other like gear position.

(b) If the gear changing operation is not completed within a first preset interval of time, then the gear changing actuator assembly is operated to return to a gear position prior to the lock. This action releases the gear changing operation having caused the lock.

(c) If the gear changing operation is not completed within a second preset interval of time, then the gear changing actuator assembly is operated again and the operation to return to the gear position prior to the foregoing gear changing operation is effected sufficiently to release the temporary lock. The operation to return to the gear position prior to the foregoing gear changing operation will be carried out within a limited interval of time required.

(d) If the measured interval of time is longer than the second preset interval of time and the gear position prior to the gear changing operation is the neutral gear position in the above step (c), then a clutch is connected and thereafter the gear changing actuator assembly is operated to return to its original operation.

With the present invention, if a temporary lock occurs, the gear changing actuator assembly is prevented from being continuously actuated and returns to its original operation to release the temporary lock. Then the assembly is operated again for a gear changing operation. This process will hereinafter be referred to as a "retry". If the original gear position is the neutral position when starting the gear changing operation again after the gear changing actuator assembly has been operated to return to the original gear position for the elimination of the temporary lock, the clutch is connected once to reduce a lock on synchronous meshing. The clutch is connected again to change the meshing phase in a synchromesh system, so that the gear changing operation can easily be effected.

According to the present invention, an interval of time, which elapses after the gear changing actuator, assembly is operated from a current gear position (by definition including a neutral gear position) to another gear position including neutral gear position) is measured with a timer, the measured interval of time being compared with a preset interval of time. The operation of the gear changing actuator assembly is stopped and the gear changing actuator assembly is operated to a different gear position from the other gear position if the operation of the gear changing actuator assembly is not completed within the preset interval of time. Therefore, when the mechanical, hydraulic, or electric system suffers from a temporary lock during a gear changing operation, no undue gear changing operation is continued and the gear changing actuator assembly is not continuously driven. This is advantageous in that the gear changing actuator assembly and the gear transmission, will not be damaged. Moreover, excessive time in which the car runs idly during gear changing operation is prevented. Accordingly, the service life of the gear transmission and the gear changing actuator assembly is not shortened, the car is subjected to less danger while running, and the gear changing operation can smoothly be effected.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
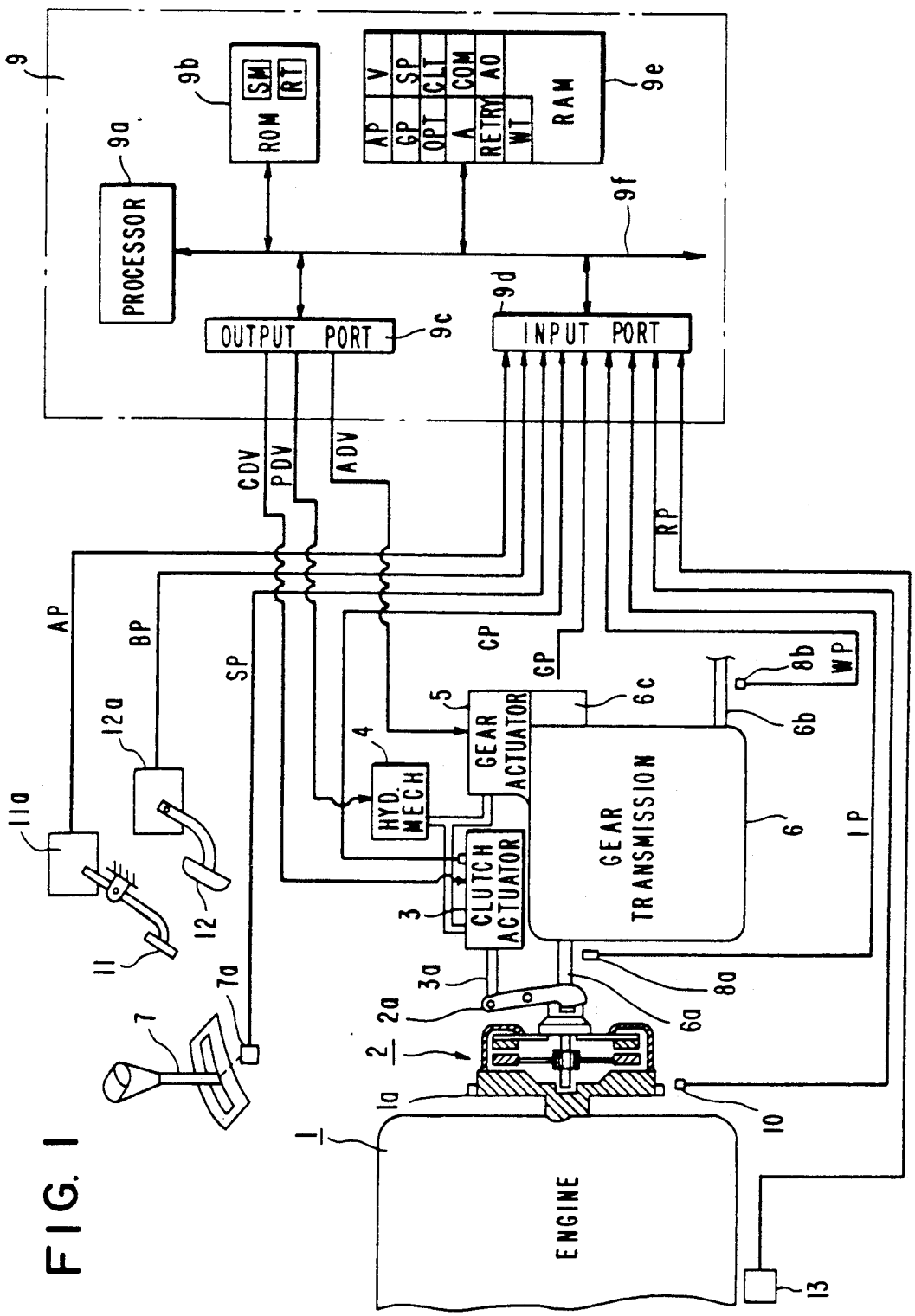
FIG. 1 is a block diagram of an automatic transmission control system by which a method of the present invention is carried out, the view also showing an automatic transmission partly in cross section.

FIG. 1 shows an engine 1 including a fuel supply control device (not shown) such as a throttle valve for controlling the amount of an air-fuel mixture introduced into the engine cylinders. The engine 1 is flywheel 1a. A clutch 2 mounted on the flywheel 1a comprises a known friction clutch having a clutch release lever 2a. The extent to which the clutch 2 is engaged or connected is controlled by a clutch actuator 3 having a piston rod 3a connected to the clutch release lever 2a. The clutch actuator 3 is operated by a hydraulic mechanism 4.

A gear transmission 6 having a synchromesh system is actuated by a gear changing or transmission actuator assembly 5 for effecting a desired gear changing operation. The gear transmission 6 has an input shaft 6a coupled to the clutch 2, an output shaft (drive shaft) 6b, and a gear position sensor 6c for detecting a selected gear position of the gear transmission 6.

A select lever 7 which is manipulated by the driver is selectively shiftable into an "N" range (neutral gear position), a "D" range (automatic gear changing position), a "1" range (1st gear position), a "2" range (2nd gear position), a "3" range (automatic gear changing position for 1st, 2nd and 3rd gears), and an "R" range (reverse gear position). The select lever 7 is associated with a select position sensor 7a for issuing a selection signal SP indicative of a selected range position A rotation sensor 8a is disposed in confronting relation to the input shaft 6a for detecting the number of r.p.m. of the input shaft 6a. A car speed sensor 8b is disposed in confronting relation to the output shaft 6b for detecting the car speed based on the number of r.p.m. of the output shaft 6b. An engine rotation sensor 10 is disposed in confronting relation to the flywheel 1a for detecting the number of r.p.m. of the flywheel 1a to detect the number of r.p.m. of the engine 1.

An electronic control system 9 for controlling the automatic transmission comprises a microcomputer composed of a processor 9a for effecting arithmetic operations, a read-only memory (ROM) 9b storing a control program for controlling the gear transmission 6 and the clutch 3, an output port 9c, an input port 9d, a random-access memory (RAM) 9e for storing the results of the arithmetic operations, and an address and data bus (BUS) 9f interconnecting the processor 9a, the ROM 9b, the output and input ports 9c, 9d, and the RAM 9e. The output port 9c is connected to the clutch actuator 3, the hydraulic mechanism 4, and the gear changing actuator assembly 5 and issues drive signals CDV, PDV, ADV for driving the clutch actuator 3, the hydraulic mechanism 4, and the gear changing actuator assembly 5, respectively.

The input port 9d is connected to the gear position sensor 6c, the select position sensor 7a, the rotation sensor 8a, the car speed sensor 8b, the engine rotation sensor 10, an accelerator pedal sensor 11a a brake pedal sensor 12a and a water temperature sensor 13 (later described), and receives detected signals respectively from these sensors. An accelerator pedal 11 is associated with accelerator pedal sensor 11a comprising a potentiometer for detecting the extent or depth to which the accelerator pedal 11 has been depressed. A brake pedal 12 is associated with brake pedal sensor 12a comprising a switch for detecting the extent or depth to which the brake pedal 12 has been depressed. Water temperature sensor 13 serves to detect the temperature of engine cooling water.

Figure 2:
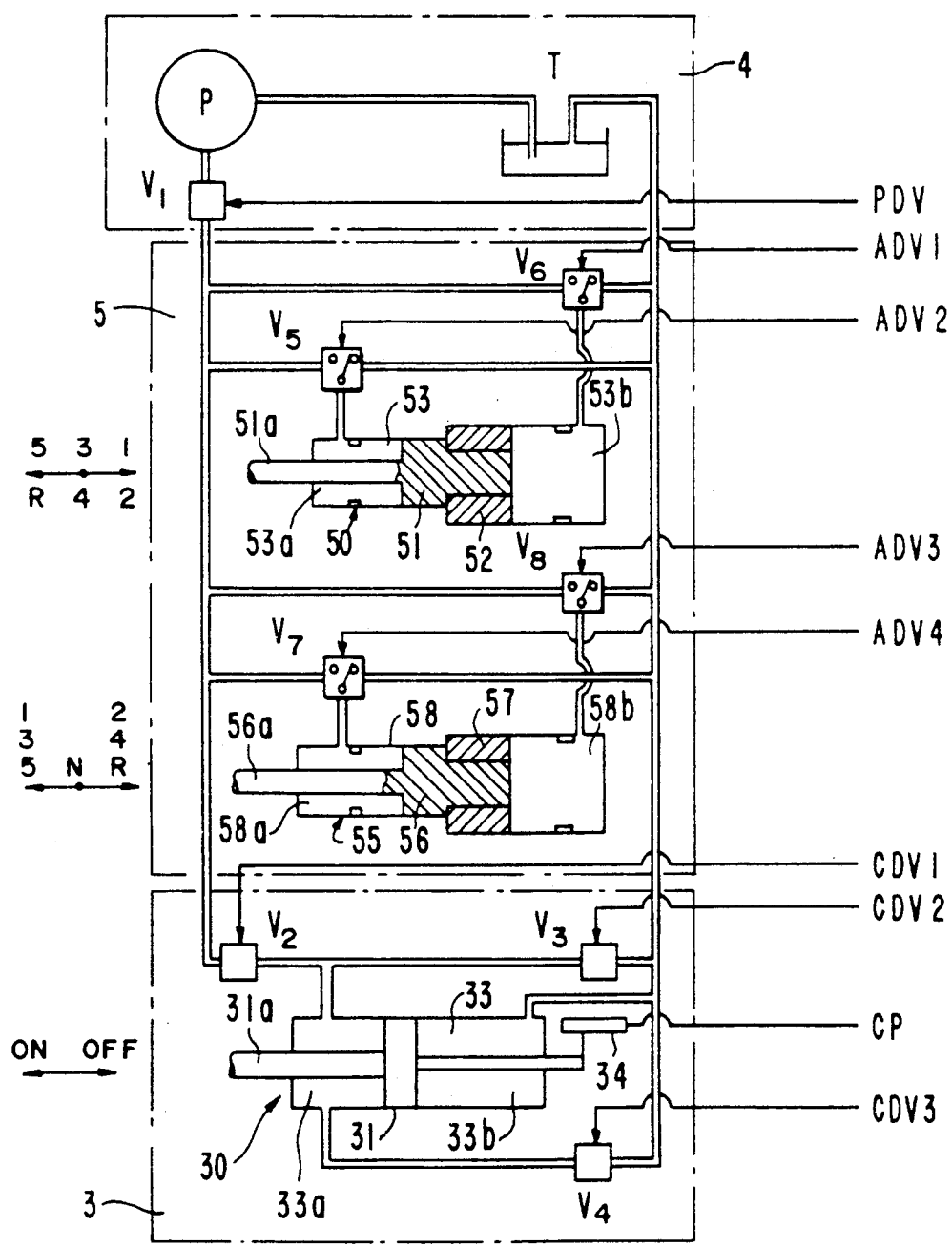
FIG. 2 is a schematic view, partly in cross section, of a clutch actuator, a gear changing actuator, and a hydraulic mechanism in the automatic transmission shown in FIG. 1.

FIG. 2 shows in greater detail the clutch actuator 3, the gear changing actuator assembly 5, and the hydraulic mechanism 4.

The hydraulic mechanism 4 is composed of a tank T, a hydraulic pump P, and an on-off valve $V_1$.

The clutch actuator 3 comprises a cylinder assembly 30 composed of a cylinder 33, a piston 31 slidably disposed therein, and a piston rod 31a (3a in FIG. 1) having one end connected to the piston 31 and an opposite end to the release lever 2a of the clutch 2. The cylinder 33 has a fluid chamber 33a communicating with the pump P through an on-off valve V and the on-off valve $V_1$, and also with the tank T through an on-off valve $V_3$ and an on-off valve $V_4$ which is pulse-controlled. The cylinder 33 has another fluid chamber 33b communicating with the tank T at all times. A position sensor 34 detects an operated position of the piston rod 31a to thereby issue a signal indicative of the corresponding extent to which the clutch 2 is engaged.

When the on-off valve V is opened by a drive signal $CDV_1$ from the electronic control system 9, a hydraulic pressure is supplied from the pump P to the fluid chamber 33a to displace the piston 31 to the right (in FIG. 2), thereby disconnecting the clutch 2. When the on-off valves $V_3$, $V_4$ are opened by drive signals $CDV_2$, $CDV_3$, respectively, from the electronic control system 9, the hydraulic pressure is released from the fluid chamber 33a to displace the piston 31 to the left thus connecting the clutch 2. At this time, the on-off valve $V_4$ is pulse-driven by the drive signal $CDV_3$ to connect the clutch 2 gradually.

The gear changing actuator assembly 5 comprises a select actuator 50 and a shift actuator 55, which can selectively be stopped in three positions. The select actuator 50 is composed of a stepped cylinder 53, a first piston 51 slidably disposed in the stepped cylinder 53, and a second tubular piston 52 slidably disposed in the stepped cylinder 53 and fitted over the first piston 51. Likewise, the shift actuator 55 is composed of a stepped cylinder 58, a first piston 56 slidably disposed in the stepped cylinder 58, and a second tubular piston 57 slidably disposed in the stepped cylinder 58 and fitted over the first piston 56. The first pistons 51, 56 of the select and shift actuators 50, 55 have piston rods 51a, 56a held in engagement with internal levers (not shown) in the gear transmission 6. The stepped cylinder 53 has fluid chambers 53a, 53b one on each side of the pistons 51, 52, and the stepped cylinder 58 has fluid chambers 58a, 58b one on each side of the pistons 56, 57. When a hydraulic pressure is supplied to the fluid chambers 53a, 53b, 58a, 58b, the actuators 50, 55 are in their neutral position as illustrated in FIG. 2. When a hydraulic pressure acts in the fluid chambers 53a, 58a, the first pistons 51, 56 and the second pistons 52, 57 are moved to the right (in FIG. 2). When a hydraulic pressure acts in the fluid chambers 53b, 58b, only the first pistons 51, 56 are moved to the left.

The fluid chambers 53a, 53b in the select actuator 50 are held in communication through directional control valves $V_5$, $V_6$ respectively with the pump P (via the on-off valve $V_1$) and the tank T. The fluid chambers 58a, 58b in the shift actuator 55 are held in communication through directional control valves $V_7$, $V_8$ respectively with the pump P (via the on-off valve $V_1$) and the tank T.

In the illustrated condition, the gear transmission 6 is in a neutral gear position. When the directional control valve $V_7$ is communicated to the pump P by a drive signal $ADV_4$ from the electronic control system 9 and the directional control valve $V_8$ is communicated to the tank T by a drive signal $ADV_3$, the piston rod 56a is moved to the right to enable the gear transmission 6 to select a 4th gear position. When a gear changing signal is generated indicating a gear shift from the 4th gear position to a 5th gear position, the electronic control system 9 applies the drive signals $ADV_3$, $ADV_4$ to communicate the directional control valves $V_8$, $V_7$ with the pump P so that the shift actuator 55 is returned to the neutral position as shown. Then, the electronic control system 9 issues a drive signal $ADV_1$ to communicate the directional control valve $V_6$ with the pump P and a drive signal $ADV_2$ to communicate the directional control valve $V_5$ with the tank T. Thus, the piston rod 51a is moved to the left to shift the select actuator 50 to a 5th-reverse select position. The electronic control system 9 thereafter applies the drive signal $ADV_3$ to communicate the directional control valve $V_8$ with the pump P and the drive signal $ADV_4$ to communicate the directional control valve $V_7$ with the tank T. Thus, the shift actuator 55 is shifted to a 5th gear position whereupon the gear transmission 6 selects a 5th gear.

The directional control valves $V_6$, $V_5$, $V_8$, $V_7$, are operated respectively by the drive signals $ADV_1$, $ADV_2$, $ADV_3$, $ADV_4$ from the electronic control system 9 to alternately actuate the select and shift actuators 50, 55 for enabling the gear transmission 6 to select desired gear positions.

Operation of the arrangement illustrated in FIGS. 1 and 2 will now be described.

(1) It is assumed that the select lever 7 is shifted to the one of the "1", "2", "3", and "D" ranges to enable the position sensor 7a to issue a range selection signal SP via the input port 9d to the processor 9a. The processor 9a receives a car speed signal WP from the car speed sensor 8b and a depression signal AP from the sensor 11a for the accelerator pedal 11 through the input port 9d.

(2) Then, the processor 9a computes a car speed V from pulse intervals of the car speed signal WP, and stores the car speed V and the accelerator pedal depression AP in the RAM 9e. The processor 9a searches a shift map based on the car speed V and the accelerator pedal depression AP stored in the RAM 9e to determine an optimum gear position.

Figure 3:
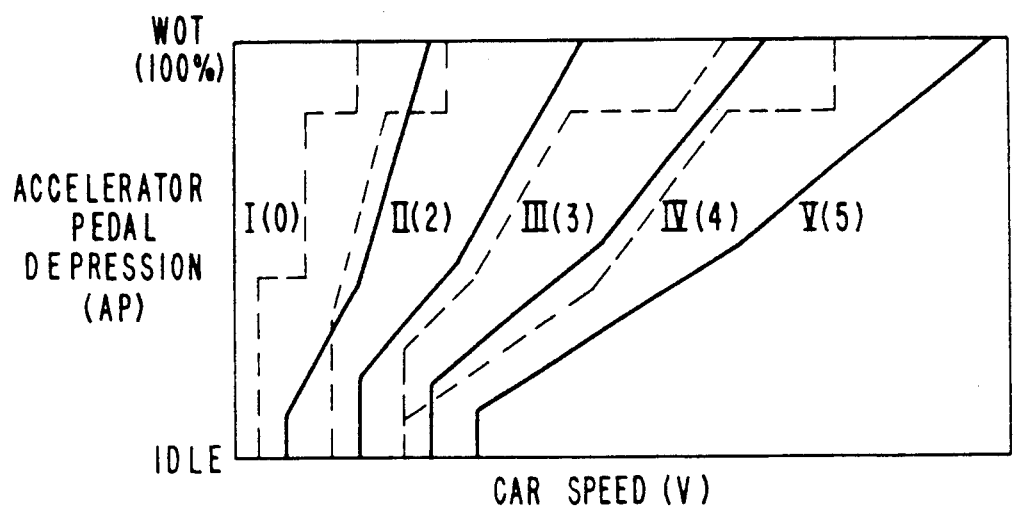
FIG. 3 is a diagram illustrating a gear shift map for the automatic transmission shown in FIG. 1.

The shift map is stored as a table SM in the ROM 9b and is dependent on the car speed V and the accelerator pedal depression AP. As illustrated in FIG. 3, the shift map has areas representative of gear positions I, II, III, IV, V which are bounded by solid lines at the time the gears are shifted up and by dotted lines at the time the gears are shifted down. Therefore, the shift map is a mixture of a shift-up map and a shift-down map.

The processor 9a relies on the shift map to determine an optimum gear position OPT dependent on the car speed V and the accelerator pedal depression AP.

(3) Then, the processor 9a determines if it is possible to shift the gears to the optimum gear position OPT. The processor 9a thereafter reads a current gear position GP from the gear position sensor 6c through the input port 9d and compares the current gear position GP with the optimum gear position OPT. If the current gear position GP is different from the optimum gear position OPT, then the processor 9a decides that the gears can be shifted, and if not, the processor 9a decides that the gears cannot be shifted.

Figure 5:
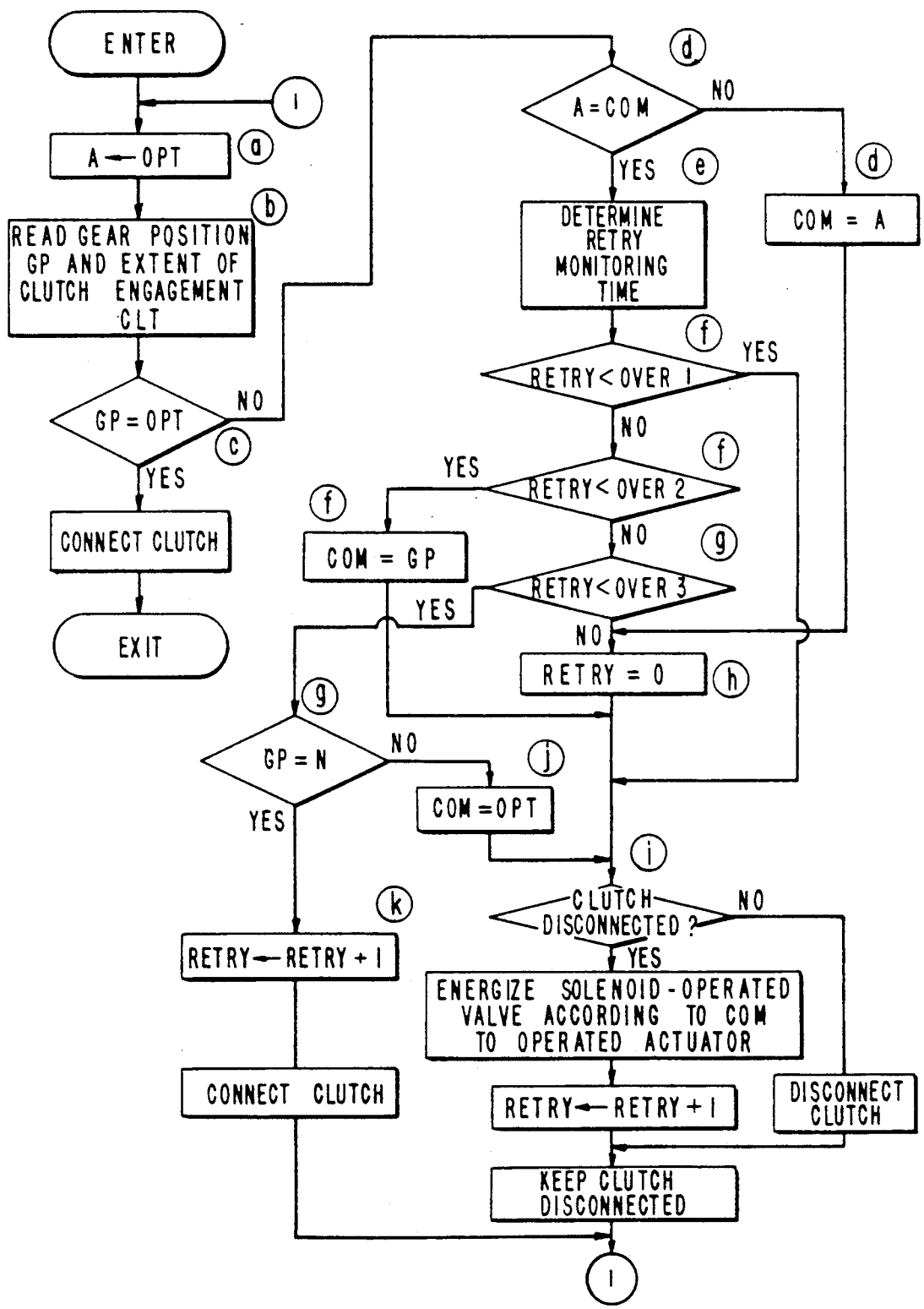
FIG. 5 is a flowchart of progressive steps of operation of the automatic transmission control system.

When it is thus determined that the gears can be shifted, gear changing operation according to the present invention will be effected. FIG. 5 illustrates a flowchart of progressive steps of gear changing operation of the invention, the steps being as follows:

(a) In step (a) as illustrated in FIG. 5, the processor 9a transfers the optimum gear position OPT in the RAM 9e to an area A in the RAM 9e.

(b) Then in step (b) of FIG. 5, the processor 9a reads a gear position GP from the gear position sensor 6c and an extent of engagement CP of the clutch 2 from the position sensor 34 for the clutch actuator 3 through the input port 9d, and stores the gear position GP and the extent of engagement CP of the clutch in the RAM 9e.

(c) In step (c) as shown in FIG. 5, the processor 9a compares the optimum gear position OPT in the RAM 9e with the gear position GP. If the compared positions coincide (GP=OPT) then the processor 9a decides that the gear changing operation is completed, and controls to connect the clutch (as described later on), whereupon the program is brought to an end.

(d) If GP=OPT, then in a step (d) of FIG. 5 the processor 9a compares, with the optimum gear position OPT in the area A, a valve drive pattern COM stored in the RAM 9e. The drive pattern COM is a pattern for driving solenoid-operated valves for the gear changing actuator assembly 5, that is, an on-off pattern for each of the solenoid-operated valves for moving the shift and select actuators to prescribed positions. If, in step (d) of FIG. 5, the valve drive pattern COM disagrees with the optimum gear position OPT (COM≠OPT), then the valve drive pattern COM is. changed to A, and the program goes to a step (h). With the valve drive pattern COM thus changed, the corresponding drive signal ADV is issued through the output port 9c to the gear changing actuator assembly 5 to start the gear changing operation.

(e) If, in step (d) of FIG. 5 the valve drive pattern COM coincides with the optimum gear position OPT (COM=OPT), then a retry monitoring process according to the present invention is effected. More specifically, the processor 9a reads a water temperature WT from the water temperature sensor 13 through the input port 9d, and then determines retry monitoring times OVER1 through OVER3 based on the detected water temperature WT and the car speed V. The monitoring rates are determined by the water temperature WT and the car speed V for the reasons that the viscocity of oil in the hydraulic mechanism varies with the temperature, and the synchronous load on the gear transmission varies with the water temperature and the car speed.

The retry monitoring times should preferably be determined dependent on if the water temperature WT is higher or lower than a preset water temperature WTo, and if the car speed V is higher or lower than a preset car speed Vo as shown in the following Table:

TABLE

| | $V < V_0$ | | $V \geq V_0$ | |
|---|---|---|---|---|
| | $WT < WT_0$ | $WT \geq WT_0$ | $WT < WT_0$ | $WT \geq WT_0$ |
| OVER1 | a | b | c | d |
| OVER2 | 1.5a | 1.5b | 1.5c | 1.5d |
| OVER3 | 2a | 2b | 2c | 2d |

(f) Then, the processor 9a reads a timer area RETRY from the RAM 9e and compares the same with the retry monitoring times OVER1 through OVER3. If in step (f) illustrated in FIG. 5 RETRY<OVER1, then the processor 9a decides that the time elapsed in shifting the gears to the optimum gear position OPT is within the first retry monitoring time OVER1, and the program goes to a step (i). If in step (f) of FIG. 5 RETRY≧OVER1, then the processor 9a decides that the time elapsed in shifting the gears to the optimum gear position OPT exceeds the first retry monitoring time, and compares the time elapsed with the second retry monitoring time OVER2. If RETRY<OVER2, that is, RETRY is within the second retry monitoring time OVER2, then the processor 9a changes the valve drive pattern COM to a current gear position (optimum gear position prior to terminating the optimum gear position OPT) GP, and the program goes to the step (i). The drive signal ADV for the current gear position GP is applied via the output port 9c to the gear changing actuator assembly 5, so that the gear changing operation will now be directed from the optimum gear position OPT toward the current gear position (original position).

(g) If RETRY≧OVER2, that is, RETRY exceeds the second retry monitoring time OVER2, the processor 9a proceeds to step (g) and compares the time elapsed with the third monitoring time OVER3. If RETRY<OVER3, that is, RETRY is within the third retry monitoring time OVER3, then the processor 9a determines whether the current gear position GP in the RAM 9e is the neutral (N) position or not. If in the neutral position (GP=N) then the program goes to a step (k). If not in the neutral position (GP≠N), then the program goes to a step (j).

(h) If in step (g) of FIG. 5 RETRY≧OVER3, that is, RETRY exceeds the third retry monitoring time OVER3, then the processor 9a decides that a series of retry steps is completed, and resets the content of the timer area RETRY to zero in the step (h) of FIG. 5. The same step (h) is also followed when the gear changing operation is started in the step (d).

(i) Then in step (i), as illustrated in FIG. 5, the processor 9a compares the extent of engagement CLT of the clutch 2 stored in the RAM 9e with an extent of clutch engagement CLTo at the time the clutch 2 is disconnected. If CLT>CLTo, then the clutch is not disconnected (the clutch is connected incompletely), and therefore the clutch will be disconnected. If CLT≦CLTo, the clutch is disconnected, and the solenoid-operated valves are energized according to the value of COM to operate the actuator assembly 5, "1" is added to the content of the timer area RETRY to thereby renew the timer area RETRY and thereafter the clutch is kept disconnected. Therefore, since no gear changing operation is possible when the clutch is not completely disconnected, the timer area is renewed only after the clutch has been disconnected to effecting time counting operation.

Then, the program goes back to the step (a). (j) If the step (g) determines that the current gear position GP is not the neutral position, then the valve drive pattern COM is returned to optimum gear position OPT in the RAM 9e (step (j) as illustrated in FIG. 5). The drive signal ADV corresponding to the optimum gear position OPT is applied through the output port 9c to the gear changing actuator assembly 5, and the gear changing operation is now directed back from the current gear position GP to the optimum gear position. The program thereafter goes to the step (i).

(k) If the step (g) conversely determines that the current gear position GP is the neutral position, then "1" is added to the content of the timer area RETRY in a step (k) of FIG. 5. Thus, the timer area RETRY is renewed and thereafter the clutch is connected. More specifically, when the position returned between the first and second retry monitoring times is the neutral position, the clutch is connected between the second and third retry monitoring times. This reduces a load on synchronous meshing, or alternatively the input shaft gear is driven by the engine through the clutch to vary the synchronous meshing phase to effect so-called double clutching which is effective in releasing a locked condition. After the clutch has been connected, the program goes back to the step (b).

The foregoing steps (b) through (k) will be repeated until the gear position GP becomes the optimum gear position OPT.

As is understood from the above description, the time measured by the timer retry is obtained by counting how many times the program loop is performed with the minimum unit of time equal to the microcomputer processing time from the step (a) until the connector (1) in the flowchart of FIG. 5.

Figure 4:
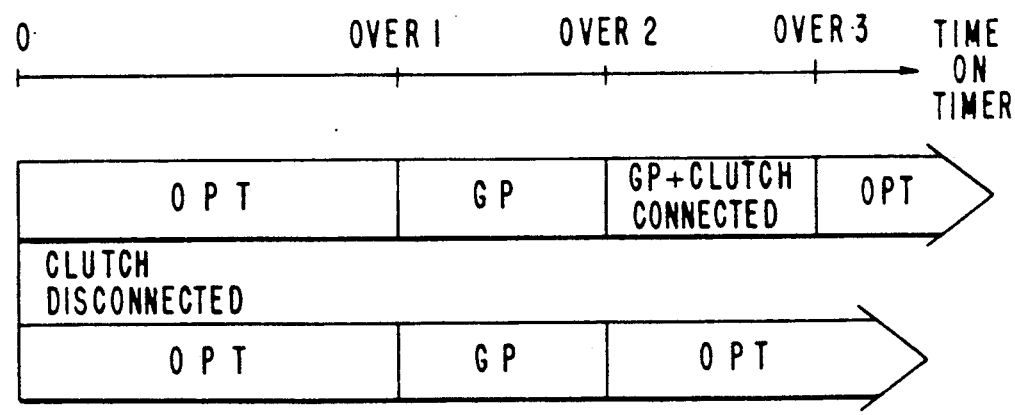
FIG. 4 is a diagram explanatory of the operation according to the method of the present invention.

The foregoing operation is summarized with reference to FIG. 4 which shows control commands, varying with time, given by the microcomputer to the actuator.

I. When it is detected that the optimum gear position OPT is different from the valve drive pattern COM, the valve drive pattern COM is rewritten into the optimum gear position (step (d)). The timer area RETRY is reset to zero (step (h)). Then, it is determined whether the clutch is disconnected or not.

II. If not disconnected, the clutch is disconnected (step (i)). If the clutch is disconnected, the solenoid-operated valves are energized according to the content of COM, and "1" is added to the timer area RETRY (step (i)) each time the program loop is performed until the gear changing operation to select, the optimum gear position is completed. When the first retry monitoring time OVER1 is exceeded, that is, when the gears are not changed during the time OVER1, the operation is changed to restore the original gear position (step (f)). The timer area RETRY is renewed with the addition of "1", and the clutch is kept disconnected (step (i)).

III. When the content of the timer area RETRY exceeds the second retry monitoring time OVER2, the clutch is connected (so-called double clutching) if the original gear position restored in II above is the neutral position, or the clutch remains disconnected to allow the gear changing operation to select the optimum gear position OPT if the original gear position is not the neutral gear position.

While in the above description the completion of the gear changing operation is detected at the time the gear position GP is renewed (GP=OPT), the gear changing operation may be detected as being completed when the ratio of the numbers of r.p.m. of the input shaft 6 and the output shaft 6b coincides with the gear ratio of the optimum gear position.

Although a preferred embodiment has been shown and described, it should be understood that many changes and modifications may be made therein without departing from the scope of the appended claims.

What is claimed is:

1. A method of controlling the gear changing operation in an automatic transmission in a car having a gear transmission, a transmission actuator for effecting the gear changing operation in the gear transmission, a friction clutch for connecting the gear transmission to and disconnecting the gear transmission from an engine, a clutch actuator for engaging and disengaging the friction clutch, and an electronic control system for controlling the transmission actuator and the clutch actuator dependent on operating conditions of the car, the method comprising the steps of:
    (a) determining an optimum gear position based on a car travelling speed detected by a car speed sensor and an extent of depression of an accelerator pedal detected by an accelerator pedal sensor;
    (b) measuring an interval of time, with a timer of the electronic control system, which elapses after the transmission actuator is operated from a current gear position to said optimum gear position;
    (c) comparing said measured interval of time with a first preset interval of time longer than said first preset interval of time and operating the transmission actuator again if said measured interval of time is longer than said first preset interval of time; and
    (d) comparing said measured interval of time with a second preset interval of time longer than said first preset interval of time and operating the transmission actuator again if said measured interval of time is longer than said second preset interval of time.

2. A method of controlling the gear changing operation according to claim 1, wherein each reset interval of time is determined dependent on if the water temperature detected by a water temperature sensor is higher or lower than a preset temperature and if the car speed detected by the car speed sensor is higher or lower than a preset speed.

3. A method of controlling the gear changing operation in an automatic transmission in a car having a gear transmission, a transmission actuator for effecting the gear changing operation in the gear transmission, a friction clutch for connecting the gear transmission to and disconnecting the gear transmission from an engine, a clutch actuator for engaging and disengaging a friction clutch, and an electronic control system for controlling the transmission actuator and the clutch actuator dependent on operating conditions of the car, the method comprising the steps of:
    (a) determining an optimum gear position based on a car travelling speed detected by a car speed sensor and an extent of depression of an accelerator pedal detected by an accelerator pedal sensor;
    (b) measuring an interval of time, with a timer of the electronic control system, which elapses after the transmission actuator is operated from a neutral position to said optimum gear position;
    (c) comparing said measured interval of time with a first preset interval of time and controlling the transmission actuator to return to a neutral position prior to the operation of the transmission actuator if said measured interval of time is longer than said first preset interval of time; and
    (d) comparing said measured interval of time with a second preset interval of time longer than said first preset interval of time, and engaging the clutch and thereafter operating the transmission actuator to return to the initial operation thereof if said measured interval time is longer than said second preset interval of time.

4. A method of controlling the gear changing operation according to claim 3, wherein each preset interval of time is determined dependent on if the water temperature detected by a water temperature sensor is higher or lower than a preset temperature and if the car speed detected by the car speed sensor is higher or lower than a preset speed.

* * * * *

UNITED STATES PATENT AND TRADEMARK OFFICE
CERTIFICATE OF CORRECTION

PATENT NO. : 5,043,895
DATED : August 27, 1991
INVENTOR(S) : Toshihiro Hattori et al.

It is certified that error appears in the above-identified patent and that said Letters Patent is hereby corrected as shown below:

Col. 2, line 43, change "actuator," to --actuator;--
line 46, change "including" to --(by definition including a--.

Col. 3, line 27, after "is" insert --connected to a--.

Col. 4, line 11, change "11a" to --11a,--;
line 34, change "V" to --$V_2$--;
line 66, change "55" to --51--.

Col. 5, lines 30 and 31 should be a continuous paragraph.

Col. 6, line 43, after "(GP=OPT)" insert a comma;
line 48, change "GP=OPT" to --GP≠OPT--.

Col. 8, line 22, begin a new paragraph with "(j)".

Signed and Sealed this

Sixth Day of April, 1993

*Attest:*

STEPHEN G. KUNIN

*Attesting Officer*   *Acting Commissioner of Patents and Trademarks*